(12) United States Patent
Michael et al.

(10) Patent No.: US 7,688,528 B2
(45) Date of Patent: Mar. 30, 2010

(54) MOUNT FOR OPTICAL COMPONENT HAVING INDEPENDENT MULTI-AXIAL CONTROL

(75) Inventors: Heuser Michael, Rancho Santa Margarita, CA (US); Guerrero Christopher, Irvine, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 11/828,841

(22) Filed: Jul. 26, 2007

(65) Prior Publication Data
US 2008/0037150 A1 Feb. 14, 2008

Related U.S. Application Data

(60) Provisional application No. 60/837,522, filed on Aug. 14, 2006.

(51) Int. Cl.
*G02B 7/02* (2006.01)
*G02B 15/14* (2006.01)

(52) U.S. Cl. .................. 359/811; 359/694; 359/822

(58) Field of Classification Search ......... 359/694–701, 359/819–824
See application file for complete search history.

(56) References Cited

U.S. PATENT DOCUMENTS 6,397,009 B1 * 5/2002 Ito et al. .................. 396/79
6,411,448 B2 * 6/2002 Takanashi et al. .......... 359/822

* cited by examiner

*Primary Examiner*—Mohammed Hasan
(74) *Attorney, Agent, or Firm*—Fountain Law Group, Inc.; George L. Fountain

(57) ABSTRACT

A mount for an optical component is disclosed that provides the flexibility of independently adjusting the position and orientation of the optical component along and about one or more axes. In an exemplary embodiment, the mount includes a support element for supporting the optical component; one or more rotational adjustment elements for rotating said support element independently about one or more axes, respectively; and one or more linear adjustment elements for moving said support element independently along one or more axes. The adjustment elements may be manually adjustable and/or may be adjustable by an actuator. In the latter case, the actuator may be electronically controlled by a controller. The optical component may be a reflective, transmissive, or reflective/transmissive optical device, such as diffraction gratings, mirrors, beam splitters, and others.

32 Claims, 14 Drawing Sheets

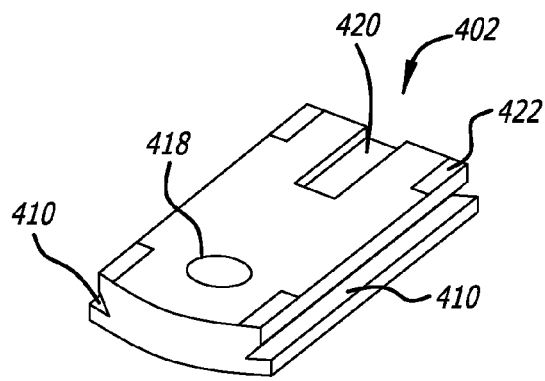
FIG. 14A
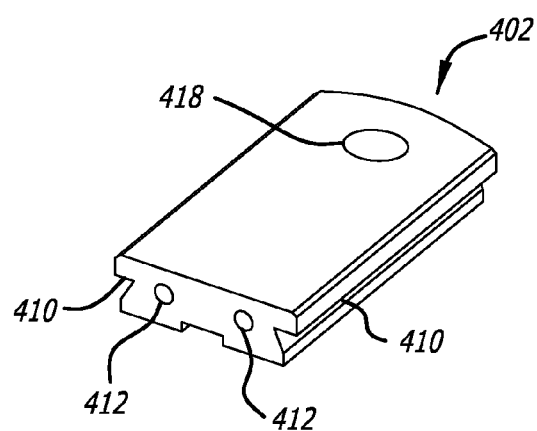
FIG. 14B
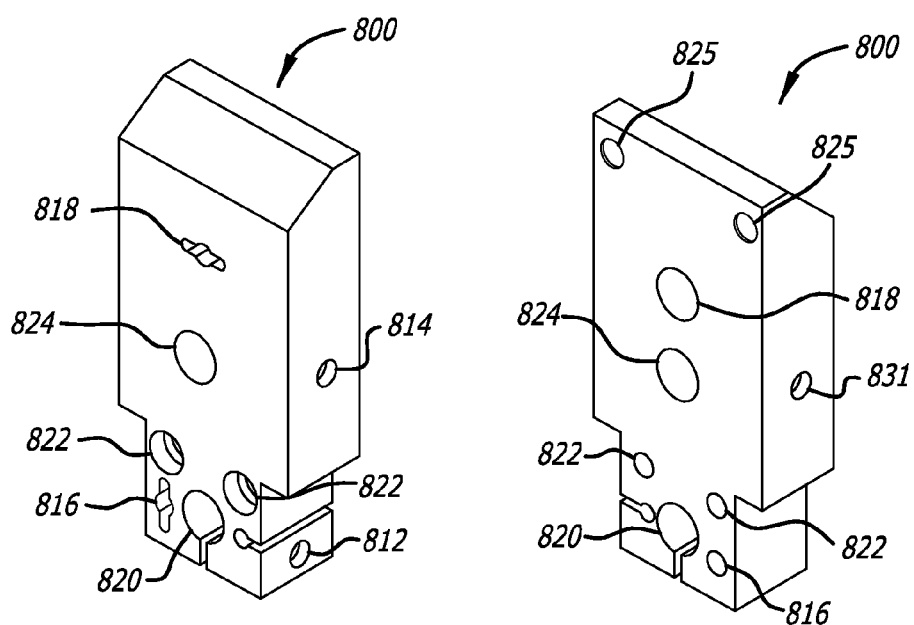
FIG. 15A
FIG. 15B

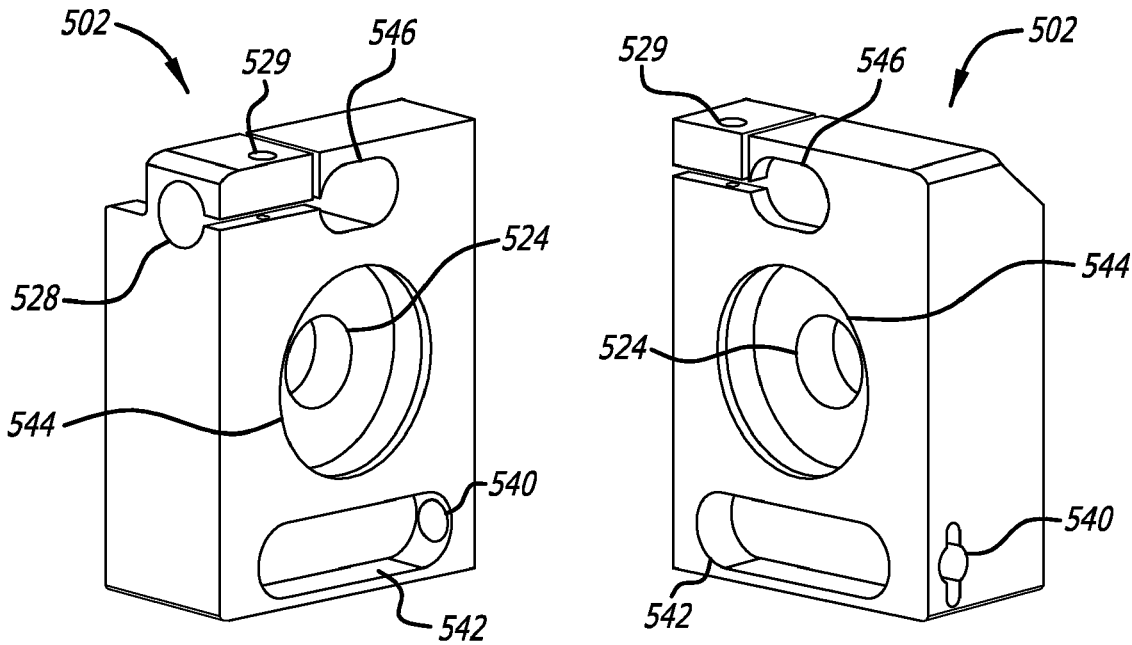
FIG. 16A
FIG. 16B
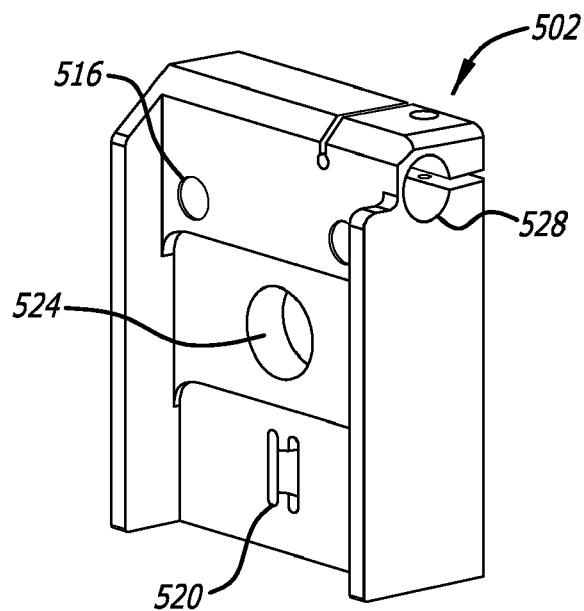
FIG. 16C

MOUNT FOR OPTICAL COMPONENT HAVING INDEPENDENT MULTI-AXIAL CONTROL

CROSS REFERENCE TO A RELATED APPLICATION

This application claims the benefit of Provisional Application Ser. No. 60/837,522 filed on Aug. 14, 2006, which is herein incorporated by reference.

BACKGROUND

Optical systems typically comprise a plurality of components including laser sources, mirrors, diffraction gratings, beam splitters, and other optical components. The position and orientation of the optical components relative to each other generally require careful consideration in order to implement the desired functionality of the system. Since the wavelength of light emissions is relatively small (e.g., in the nanometer range), the position and orientation of the optical components generally require substantial precision.

In the past, optical systems included custom-made mounts for supporting individual optical components. These custom-made mounts only provided support for the optical components. Generally, the entire mount would have to be manually moved in order to properly position and orientate the optical component to achieve the desired functionality. Because the wavelength of light emissions is relatively small, proper positioning and orientation of optical components would typically be time-consuming, inaccurate, and not very repeatable.

SUMMARY

An aspect of the invention relates to a mount for an optical component that provides the flexibility of independently adjusting the position and orientation of the optical component along and about one or more axes. In an exemplary embodiment, the mount comprises a support element for supporting the optical component; one or more rotational adjustment elements for rotating said support element independently about one or more axes, respectively; and one or more linear adjustment elements for moving said support element independently along one or more axes, respectively. The adjustment elements may be manually adjustable and/or may be adjustable by an actuator. In the latter case, the actuator may be electronically controlled by a controller. The optical component may be a reflective, transmissive, or reflective/transmissive optical device, such as diffraction gratings, mirrors, beam splitters, and others.

In a more specific embodiment, the mount comprises a support element for supporting the optical component; a first adjustment element for moving the support element only along a first axis; a second adjustment element for rotating the support element only about the first axis; and a third adjustment element for rotating the support element only about a second axis that is substantially orthogonal to the first axis. The mount may further comprise a fourth adjustment element for adjusting the rotation of the support element about a third axis that is substantially orthogonal to the first and second axes. The mount may additionally comprise fifth and/or sixth adjustment elements for independently moving the support element along the second and third axes, respectively. The adjustment elements may include locks for fixing the position and orientation of the support element in selected positions and orientations. The adjustment elements may be controlled manually or by an actuator.

Yet another aspect of the invention relates to an optical control system, comprising a mount, a controller, and a plurality of actuators. The mount, in turn, comprises a support for an optical component; and one or more rotational adjustment elements for independently rotating the support about one or more axes; and one or more linear adjustment elements for independently moving the support along one or more axes. The optical control system includes one or more actuators for actuating the one or more rotational adjustment elements; and one or more actuators for actuating the one or more linear adjustment elements. The controller controls the actuators in actuating the rotational and linear adjustment elements to orientate and position the optical component.

Other aspects, advantages and novel features of the present invention will become apparent from the following detailed description of the invention when considered in conjunction with the accompanying drawings.

BRIEF DESCRIPTION OF THE DRAWINGS

FIGS. 14A-B illustrate bottom and top perspective views of the exemplary slider in accordance with an embodiment of the invention;

FIGS. 15A-B illustrate rear and front perspective views of the exemplary bridge assembly in accordance with an embodiment of the invention;

FIGS. 16A-C illustrate a pair of front perspective views and a rear perspective view of the exemplary pivoting member in accordance with an embodiment of the invention;

DETAILED DESCRIPTION

Figure 1:
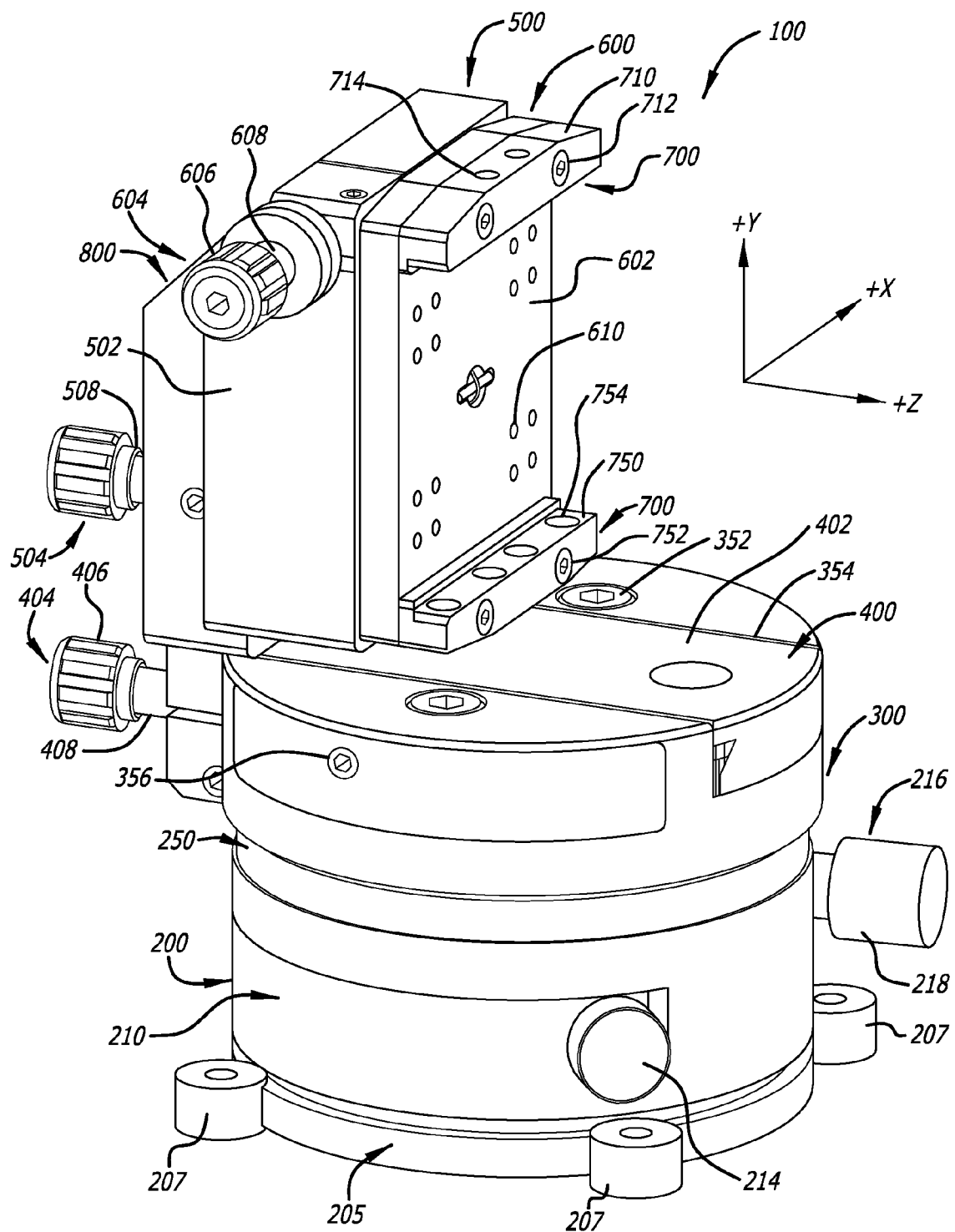
FIG. 1 illustrates a front perspective view of an exemplary mount for an optical component in accordance with an embodiment of the invention.
Figure 2:
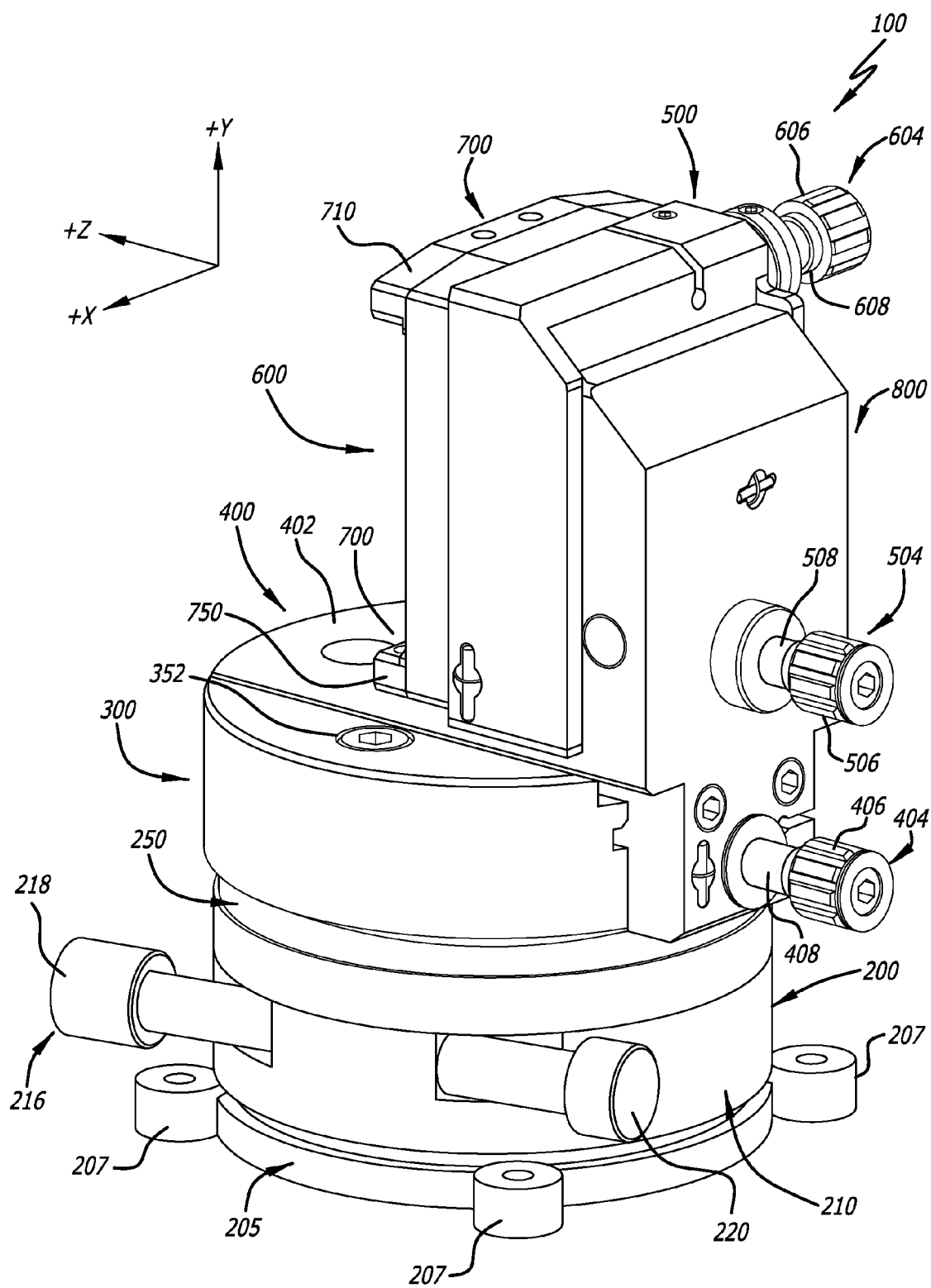
FIG. 2 illustrates a rear perspective view of an exemplary mount for an optical component in accordance with an embodiment of the invention.

FIGS. 1-2 illustrate front and rear perspective views of an exemplary mount 100 for an optical component in accordance with an embodiment of the invention. The mount 100 provides for independent position adjustment of the mounted optical component along one or more linear axes. In addition, the mount 100 provides for independent orientation adjustment about one or more rotational axes. The position and orientation adjustments may be made manually and/or by actuator control, as discussed in more detail below. The exemplary mount 100 is able to support and adjust the position and orientation of a wide variety of optical components, such as diffraction gratings, mirrors, beam splitters, reflective components, transmissive components, and others.

In particular, the exemplary mount 100 comprises seven (7) primary assemblies. These assemblies are a rotatable stage 200, a base 300, a z-axis linear adjustment assembly 400, a pitch adjustment assembly 500, a roll adjustment assembly 600, a support assembly 700 for the optical component, and a bridge assembly 800. The rotatable stage 200 provides for the rotation of the optical component about a y-axis. The base 300 mechanically couples the top assemblies 500, 600, 700, and 800 to the rotatable stage 200 such that rotation of the stage 200 produces rotation of these assemblies including the optical component.

The z-axis adjustment assembly 400 slides along a channel formed through the base 300 to provide z-axis position adjustment of the optical component. The pitch adjustment assembly 500 is pivotally coupled to the bridge assembly 800 to provide rotational adjustment of the optical component about the x-axis. The roll adjustment assembly 600 is pivotally coupled to the pitch adjustment assembly 500 to provide rotational adjustment of the optical component about the z-axis. The support assembly 700 securely supports the optical component in a vertical orientation. The bridge assembly 800 mechanically couples the z-axis adjustment assembly 400 to the pitch and roll adjustment assemblies 500 and 600 such that movement of the z-axis adjustment assembly 400 along the z-axis produces movement of the pitch and roll adjustment assemblies 500 and 600 along the z-axis.

More specifically, the rotatable stage 200 comprises a fixed lower portion 205, a rotatable middle portion 210 and an rotatable upper portion 250. The fixed lower portion 205 comprises a plurality of submounts 207 (e.g., donut-shaped submounts) for securely attaching the mount 100 to a fixed surface. In this example, the submounts 207 are equally spaced around the circumference of the fixed lower portion 205 of the rotatable stage 200. The rotatable middle portion 210 of the rotatable stage 200 comprises a rotation lock 214 for selectively locking the rotation of the rotatable middle portion 210 with respect to the fixed lower portion 205. The rotatable middle portion 210 further comprises a fine coarse adjustment 216 for adjusting the rotation of the rotatable upper portion 250 by relatively small angular distances with respect to the middle portion 210. The fine coarse adjustment 216 comprises an adjustment knob 218 and a lock 220 for selectively locking the adjustment knob 218; and effectively locking the rotation of the rotatable upper portion 250 with respect to the middle portion 210. The middle and/or upper portions 210 and 250 of the rotatable stage 200 may include indicia (not shown) of a measurement scale to assist the user in setting the proper orientation for the optical component.

The base 300 is securely attached to the rotatable upper portion 250 of the rotatable stage 200 by one or more securing devices, such as screws 352. The base 300 may be manually rotatable to change the orientation of the optical component, or may be rotated by an actuator which may be controlled by a controller, such as a computer, microcontroller, microprocessor, etc. As previously discussed, the base 300 comprises a channel 354 elongated in the z-axis direction which guides the movement of the z-axis adjustment assembly 400 along the z-axis direction. The base 300 may further include a lock 356 for selectively locking the movement of the z-axis adjustment assembly 400.

The z-axis adjustment assembly 400 comprises an elongated slider 402 situated longitudinally within the channel 354 of the base 300. The z-axis adjustment assembly 400 further comprises a z-axis adjustment device 404 for adjusting the position of the optical component along the z-axis direction. In this example, the z-axis adjustment device 404 comprises a knob 406 attached to (or integral with) a fine threaded screw 408 that threads with a corresponding threaded bore of the bridge assembly 800. The screw 408 includes an end that abuts a side of the base 300. The z-axis adjustment assembly 400 further includes a spring (not shown in FIGS. 1 and 2) that biases the base 300 against the end of the screw 408. When the knob 406 is turned in a clockwise direction, the threaded bore of the bridge assembly 800 moves in the negative z-direction, causing the slider 402 to move in the negative z-direction. When the knob 406 is turned in the counterclockwise direction, the threaded bore of the bridge assembly 800 moves in the positive z-direction, causing the slider 402 to move in the positive z-direction. The z-axis adjustment device 404 may be removable and replaced with an actuator arm for electronically adjusting the z-axis position of the slider 402; and ultimately, the z-axis position of the optical component.

The pivot adjustment assembly 500 comprises a pivoting member 502 that is pivotally coupled to an upper portion of the bridge assembly 800. The pivot adjustment assembly 500 further comprises a pivot adjustment device 504 for adjusting the pivot orientation of the pivoting member 502. In this example, the pivot adjustment device 504 comprises a knob 506 attached to (or integral with) a fine threaded screw 508 that threads with a corresponding threaded bore of the bridge assembly 800. The screw 508 includes an end that abuts a lower portion of the pivoting member 502. The pivot adjustment assembly 500 further includes a spring (not shown in FIGS. 1 and 2) that biases the lower portion of pivoting member 502 against the end of the screw 508. Thus, when the knob 506 is turned in a clockwise direction, the screw 508 moves in the positive z-direction, and consequently forces the pivoting member 502 to pivot in a counterclockwise direction (from the perspective of FIG. 1) against the biasing force of the spring. When the knob 506 is turned in the counterclockwise direction, the screw 508 moves in the negative z-direction, and the biasing force of the spring forces the pivoting member 502 to pivot in the clockwise direction (from the perspective of FIG. 1). The pivot adjustment device 504 may be removable and replaced with an actuator arm for electronically adjusting the pivot orientation of the pivoting member 502; and ultimately, the pivot orientation of the optical component.

The roll adjustment assembly 600 comprises a rolling member 602 that is rotationally coupled to the pivoting member 502 of the pivot adjustment assembly 500. The roll adjustment assembly 600 further comprises a roll adjustment device 604 for adjusting the roll orientation of the rolling member 602. In this example, the roll adjustment device 604 comprises a knob 606 attached to (or integral with) a fine threaded screw 608 that threads with a corresponding threaded bore of the pivot adjustment assembly 500. The screw 608 includes an end that abuts a post (not shown in FIGS. 1 and 2) attached to an upper portion of the rolling member 602. The post extends longitudinally towards the negative z-direction from the rolling member 602. The pivot adjustment assembly 600 further includes a spring (not shown in FIGS. 1 and 2) that biases the post of the rolling member 602 against the end of the screw 608. Thus, when the knob 606 is turned in a clockwise direction, the screw 608 moves in the positive x-direction, and consequently forces the rolling member 602 to roll in a clockwise direction (from the perspective of FIG. 1) against the biasing force of the spring. When the knob 606 is turned in the counterclockwise direction, the screw 608 moves in the negative z-direction, and the biasing force of the spring forces the rolling member 602 to pivot in a counterclockwise direction (from the perspective of FIG. 1). The adjustment device 604 may be removable and replaced with an actuator arm for electronically adjusting the roll orientation of the rolling member 602; and ultimately, the roll orientation of the optical component.

The support assembly 700 for the optical component comprises an upper support member 710 and a lower support member 750. The upper support member 710 is attached to an upper portion of the rolling member 602 by one or more fasteners, such as screws 712. Similarly, the lower support member 750 is attached to a lower portion of the rolling member 602 by one or more fasteners, such as screws 752. The rolling member 602 may include a plurality of threaded holes 610 configured to thread with the screws 712 and 752 for securing the upper and lower support members 710 and 750 of the support assembly 700 to the rolling member 602. The sets of holes 610 may be vertically spaced apart along the rolling member 602 to accommodate different vertical positions for the upper and lower support members 710 and 750 of the support assembly 700. This allows the mount 100 to accommodate different sized optical components. The lower support member 750 may further respectively comprise one or more pads 754 to provide a cushion contact of the lower support member 750 to the optical component.

Figure 3:
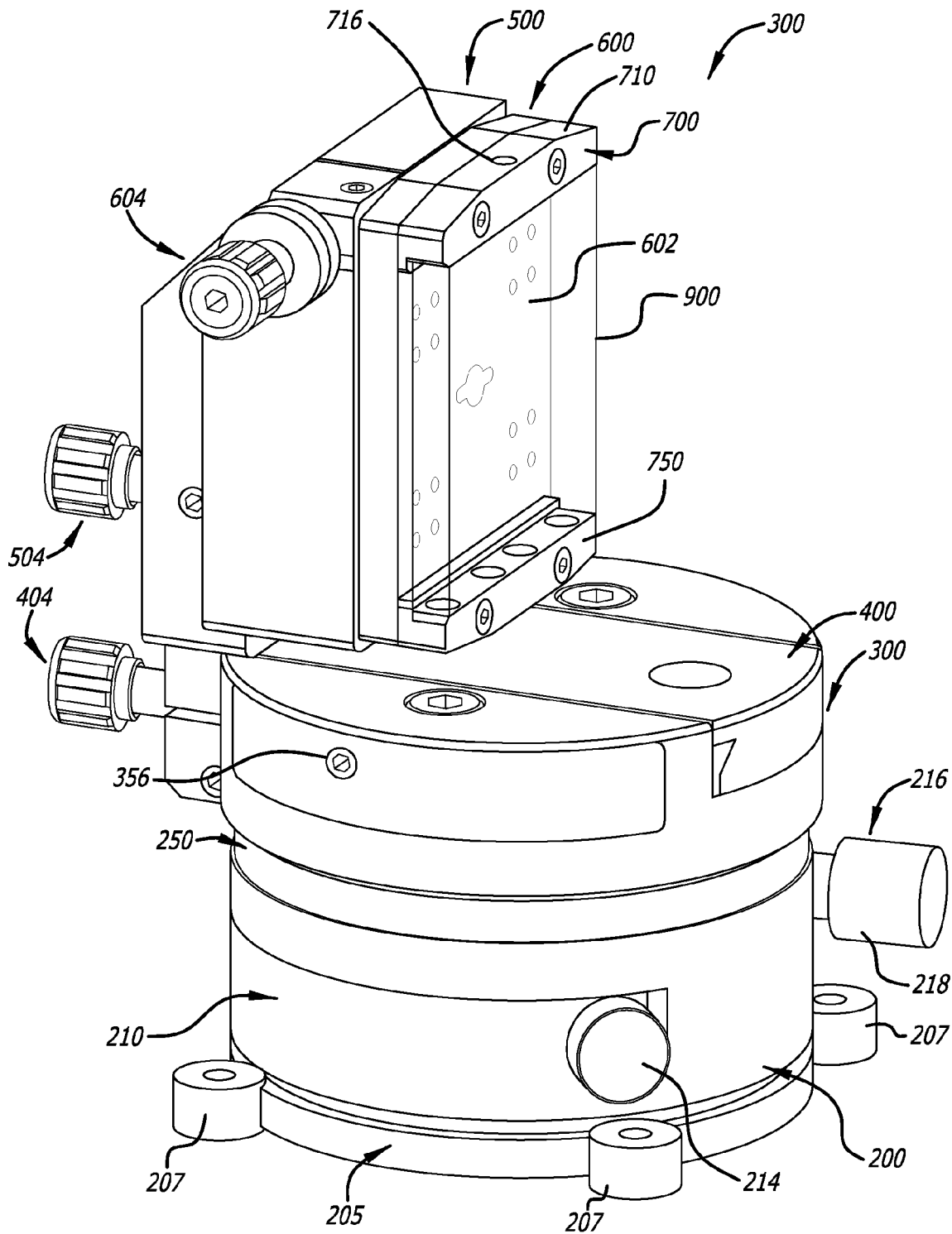
FIG. 3 illustrates a front perspective view of an exemplary mount supporting an optical component in accordance with an embodiment of the invention.

As shown in FIG. 3, the optical component 900 is sandwiched between the upper and lower support members 710 and 750 of the support assembly 700. As previously discussed, the optical component may comprise a wide variety of optical components, such as diffraction gratings, mirrors, beam splitters, reflective components, transmissive components, and others. The support assembly 700 further includes one or more screws 716, such as nylon screws or other devices, for securing the optical component to the support assembly 700.

As discussed, the mount 100 provides for independent position and orientation adjustment of the mounted optical component 900 along one or more linear and rotational axes. For instance, the mount 100 includes a z-axis adjustment assembly 400 for independently adjusting the z-axis position of the optical component. Although, in this example, the mount 100 includes an adjustment assembly for one linear direction, the mount 100 may include adjustment assemblies for linear directions, such as in the x- and y-directions. The mount 100 further includes three (3) independent rotational adjustment assemblies, such as the rotational stage 200, the pivot adjustment assembly 500, and the roll adjustment assembly 600. These features make the mount 100 versatile in positioning and orienting an optical component in an optical system.

Figure 4:
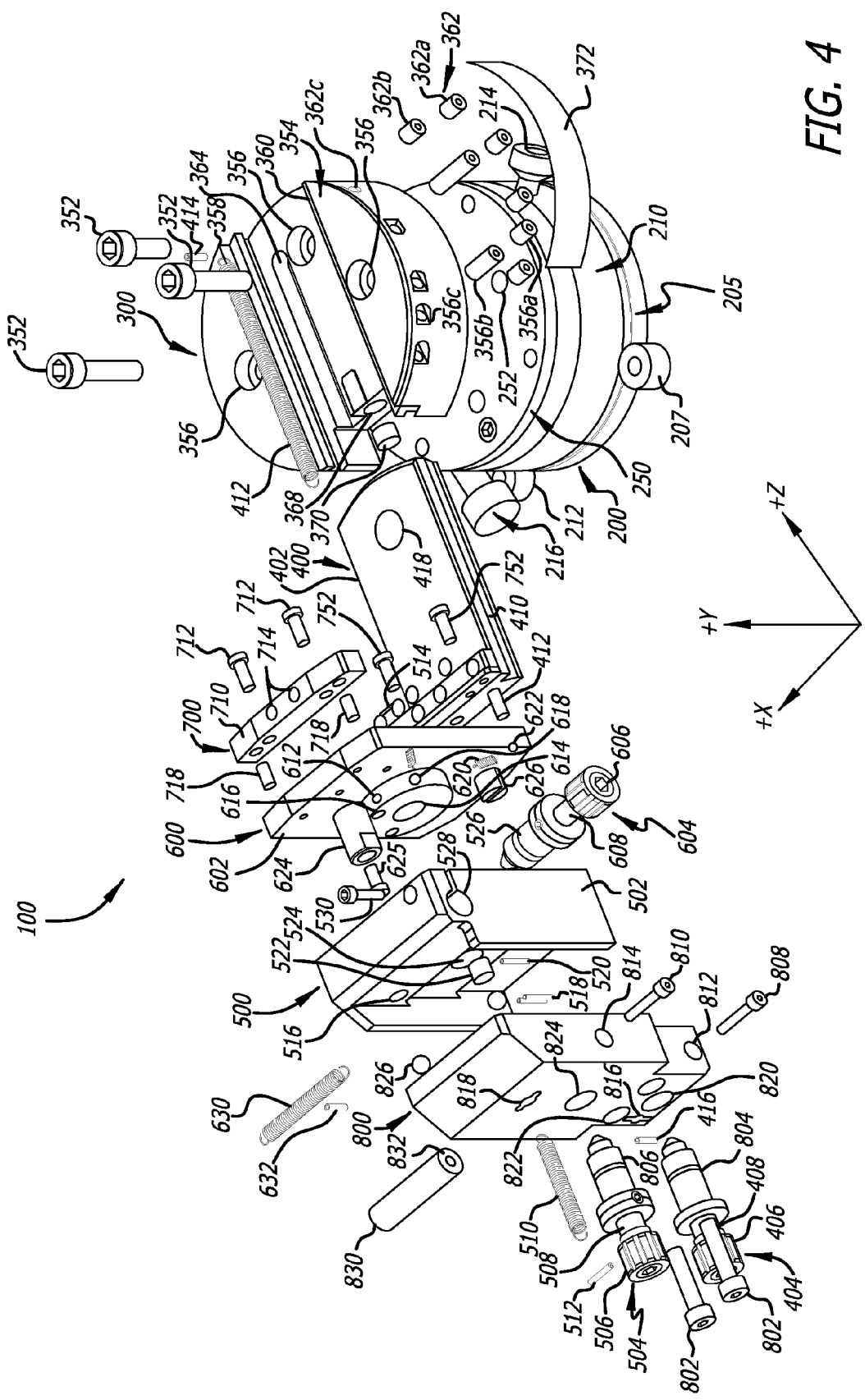
FIG. 4 illustrates an exploded perspective view of an exemplary mount for an optical component in accordance with an embodiment of the invention.

FIG. 4 illustrates an exploded perspective view of the exemplary mount 100 in accordance with an embodiment of the invention. As previously discussed, the exemplary mount 100 comprises seven (7) primary assemblies. These assemblies are the rotatable stage 200, the base 300, the z-axis linear adjustment assembly 400, the pitch adjustment assembly 500, the roll adjustment assembly 600, the support assembly 700 for the optical component, and the bridge assembly 800. This exploded diagram of the exemplary mount 100 illustrates more components of these assemblies as discussed below.

As previously discussed, the rotatable stage 200 comprises the lower fixed portion 205 including the submounts 207, and the rotatable middle portion 210 including the rotation lock 214, and the fine coarse adjustment 216. Also, as previously discussed, the rotatable stage 200 comprises the upper rotatable portion 250. As shown, the upper rotatable portion 250 includes a plurality of threaded holes 252 to thread with corresponding screws 352 in order to secure the base 300 to the upper rotatable portion 250 of the stage 200.

As previously discussed, the base 300 comprises the screws 352 situated within corresponding countersunk thru-holes 356 for securing the base 300 to the upper rotatable portion 250 of the stage 200. The base 300 further comprises the channel 354 which guides the z-axis movement of the slider 402 of the z-axis adjustment assembly 400, and the lock 356 comprising a locking screw 356a, a dowel 356b, and a thru-hole 356c formed on the side of the base 300. Additionally, the base 300 comprises an elongated rigid guide rail 358 situated longitudinally on one side of the channel 354, and an elongated resilient guide rail 360 situated longitudinally on the opposite side of the channel 354. The lock 356 prevents the movement of the slider 402 by the dowel 356b, being urged by the screw 356a into the thru-hole 356c, exerting a lateral force against the elongated resilient guide rail 360, which, in turn, exerts a frictional force on the slider 402.

The base 300 further comprises a lateral spring force device 362 comprising four (4) sets of screws 362a laterally securing corresponding springs 362b within corresponding thru-holes 362c. The ends of the springs 362b abut the elongated resilient guide rail 360. The springs 362b absorb lateral forces against the slider 402 by way of the elongated resilient guide rail 360.

The base 300 further comprises an elongated slot 364 situated longitudinally within the channel 354 for housing therein the spring 412 that biases the base 300 against the end of the screw 408 of the z-axis adjustment assembly 400. A pin 414 secures an end of the spring 412 to the base 300 within the elongated slot 364. The base 300 further comprises a stop 366 to prevent the movement of the slider 402 along the negative z-axis direction beyond a particular location. The stop 366 is in the form of a raised flat protrusion which slides within a corresponding groove (not shown in FIG. 4) on the bottom of the slider 402. The base 300 further comprises a hole 368 to receive a pad 360 at an end portion of the channel 354. The pad 370 cushions the end of the screw 408 during operation. The base 300 may further comprise an adhesive label 372 to indicate manufacturer, product information, and other information. The label 372 may be attached to the side of the base 300.

As previously discussed, the z-axis adjustment assembly 400 comprises the slider 402, and the z-axis adjustment device 404 including the knob 406 and the screw 408. The slider 402 further comprises on both sides elongated grooves 410 that respectively mate with the elongated rigid and resilient guide rails 358 and 360 of the base 300. The slide 402 further comprises one or more threaded holes 412 that threads with threaded bolts 802 for securing the bridge assembly 800 to the slider 402. The slider 402 further comprises a thru-hole 418 to allow access to the corresponding screw 352 that secures the base 300 to the upper rotatable portion 250 of the stage 200. The z-axis adjustment assembly 400 further comprises a pin 416 coupled to the other end of the spring 412, and securely situated within a catch 816 formed on the rear side of the bridge assembly 800.

As previously discussed, the pivot adjustment assembly 500 comprises the pivoting member 502, and the pivot adjustment device 504 including the knob 506 and the screw 508. Additionally, the pivot adjustment assembly 500 comprises a spring 510 that biases the pivoting member 502 against the bridge assembly 800. The spring 510 is held at one end by a pin 512 situated within a catch 818 formed on the rear side of the bridge assembly 800. The spring 508 is held at the other end by a pin 514 situated within a catch formed on the front side of the rolling member 602. The pivot adjustment assembly 500 further comprises a pair of grooves 516 that respectively receive a pair of pivot balls 826 from the bridge assembly 800. A pad 522 may be provided between one or both of the balls 826 and the corresponding groove 516 to improve the interface thereof.

The axis of rotation of the pivoting member 502 coincides substantially with the centers of the pivot balls 826. The pivot adjustment assembly 500 further comprises a pair of vertically-oriented pins 518 securely situated within corresponding vertically-oriented grooves 520 formed on the rear side of the pivot member 502. The end of the screw 508 of the pivot adjustment device 504 is situated between the grooves 520, and slides vertically along the pins 518 as the pivoting member 502 pivots. The pivoting member 502 further includes a thru-hole 524 through which the spring 510 extends from the bridge assembly 800 to the roll adjustment assembly 600. The pivot adjustment assembly 500 further comprises a hole 528 to receive a threaded bore 526 which, in turn, threads with the screw 608 of the roll adjustment device 604 for the roll adjustment assembly 600. A screw 530 is provided to secure the threaded bore 526 onto the pivoting member 502.

As previously discussed, the roll adjustment assembly 600 comprises the rolling member 602 including sets of threaded holes 610 for securing the upper and lower support members 710 and 750 of the optical component support 700 to the rolling member 602. Also, as previously discussed, the roll adjustment assembly 600 comprises the roll adjustment device 604 including the knob 606 and screw 608. The roll adjustment assembly 600 further comprises a cylindrical guide 612 situated on the rear side of the rolling member, which mates with a lubricated countersunk hole formed on the front side of the pivoting member 502. The cylindrical guide 612 includes a centralized hole 614 through which the spring 510 extends to the catch for the securing pin 514 of the spring 510. The cylindrical guide 612 further includes a plurality of pads 616 for improving the interface of the cylindrical guide 612 to the countersunk hole of the pivoting member 502. Along a particular side of the cylindrical guide 612 are a plurality of holes 618 that receive respective springs 620 and ball bearings 622 to form a resilient fit of the cylindrical guide 612 into the countersunk hole of the pivoting member 502.

The roll adjustment assembly 600 further comprises a post 624 that extends in the negative z-axis direction from the rear side of the rolling member 602. The post 624 includes a flat portion that abuts the end of the screw 608 of the roll adjustment device 604. The clockwise turning of the screw 608 causes its end to push against the post 624 to cause the rolling member 602 to roll in a particular direction. The roll adjustment assembly 600 also comprises a catch 626 to receive a securing pin 628 that secures an end of a spring 630 to the catch 626. The other end of the spring 630 is secured to the pivoting member 502 with a securing pin 632. Thus, when the screw 608 of the roll adjustment device 604 is turned in the counterclockwise direction, the biasing force of the spring 630 causes the rolling member 602 to roll in the other direction.

Most of the components of the support assembly 700 for the optical component have already been discussed. The support assembly 700 may further include a plurality of pins 718 situated within respective opposed holes of the upper and lower members 710 and 750 and the front side of the rolling member 602. The pins 718 assist in horizontally orienting the upper and lower members 710 and 750 to the rolling member 602.

As previously discussed, the bridge assembly 800 comprises a plurality of thru-holes to assist in operationally securing the z-axis adjustment assembly 400, the pivot adjustment assembly 500, and the roll adjustment assembly 600 together. For instance, the bridge assembly 800 includes thru-holes 822 through which the screws 802 extend for securing the slider 402 to the bridge assembly 800. The bridge assembly 800 further includes thru-hole 820 to receive the threaded bore 804 which threads with the screw 408 of the z-axis adjustment device 404 of the z-axis adjustment assembly 400. The bridge assembly 800 further includes thru-hole 824 to receive the threaded bore 806 which threads with the screw 508 of the pivot adjustment device 504 of the pivot adjustment assembly 400. The bridge assembly 800 includes catches 816 and 818 for the securing pins 416 and 512 for the springs 412 and 510, respectively. The bridge assembly 800 includes holes 812 and 814 for receiving screws 808 and 810 for securing the threaded bores 804 and 806 to the bridge assembly 800. The bridge assembly 800 includes a rolling pin 830 having a threaded hole 832 that threads with the screw 810 for securing the threaded bore 806 to the bridge assembly 800.

Figure 5:
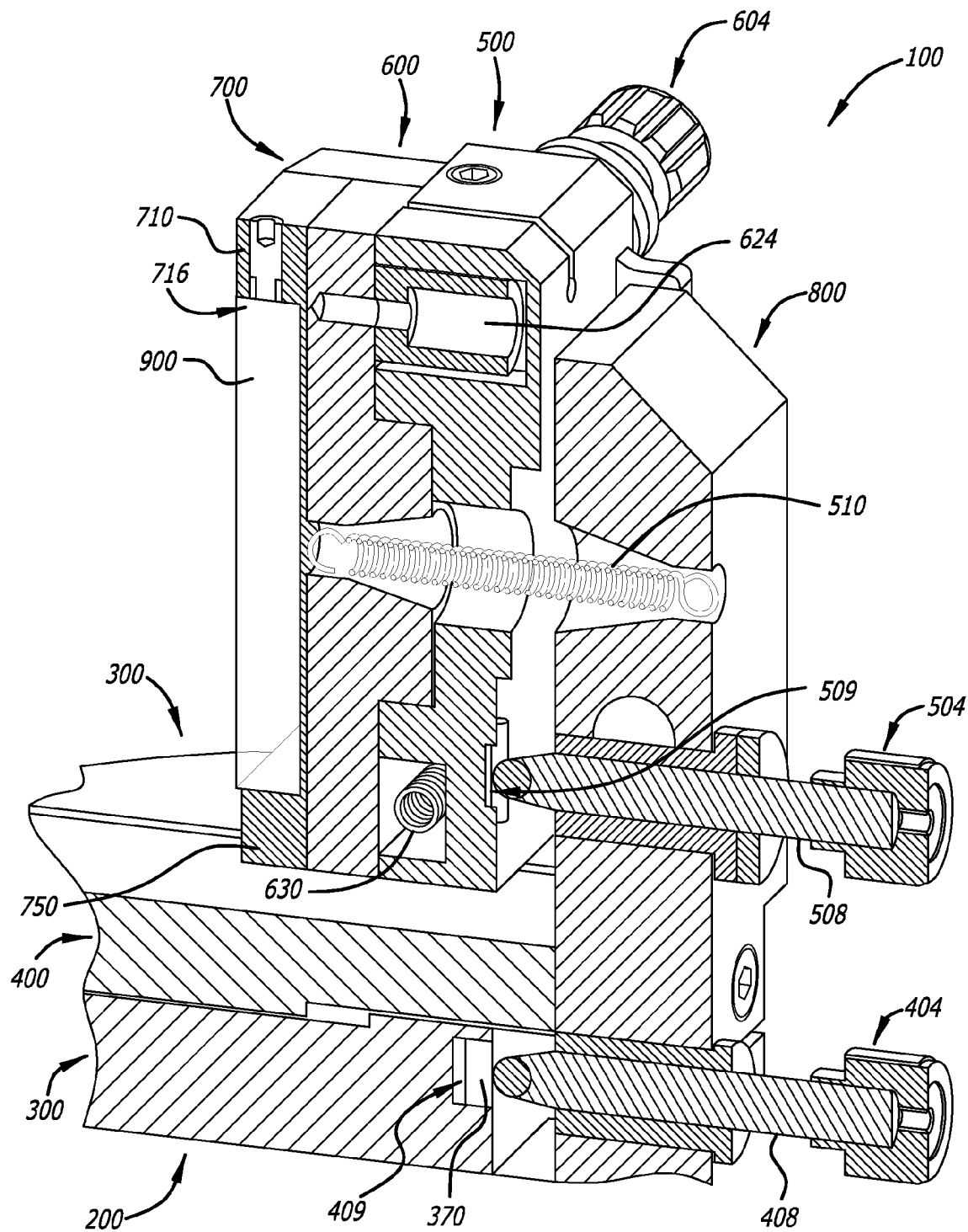
FIG. 5 illustrates a side sectional view of a portion of an exemplary mount for an optical component in accordance with an embodiment of the invention.

FIG. 5 illustrates a side sectional view of a portion of the exemplary mount 100 for an optical component in accordance with an embodiment of the invention. As shown, the screw 408 of the adjustment device 404 for the z-axis adjustment assembly 400 includes a steel ball 409 that abuts the pad 370 of the base 300. Also, the screw 508 of the adjustment device 504 for the pivot adjustment assembly 500 includes a steel ball 509 that slides between the pair of pins 518 of the pivot adjustment assembly 500. The screw 608 of the adjustment device 604 for the roll adjustment assembly 600 includes a steel ball (not shown) that abuts a flat portion of the post 624. Additionally, as shown, the end of the nylon screw 716 applies downward pressure to securely hold the optical component 900 between the upper and lower members 710 and 750 of the support assembly 700.

Figure 6:
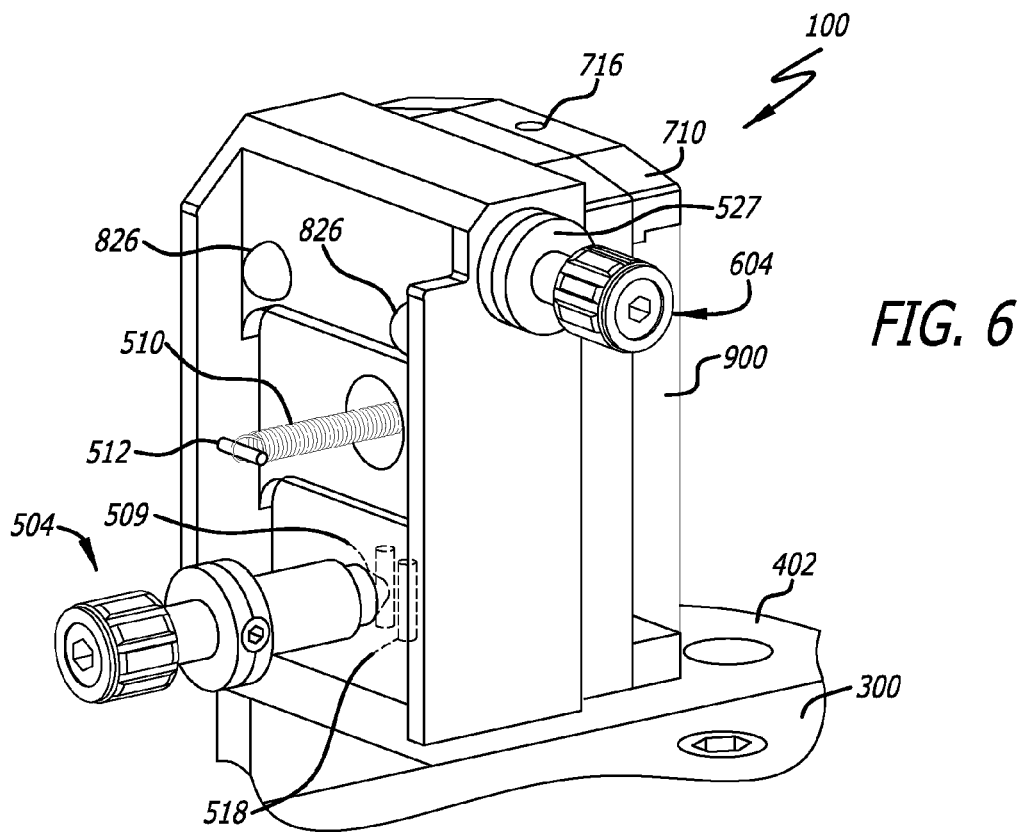
FIG. 6 illustrates a rear partial transparent view of a portion of an exemplary mount for an optical component in accordance with an embodiment of the invention.

FIG. 6 illustrates a rear partial transparent view of a portion of the exemplary mount 100 for an optical component in accordance with an embodiment of the invention. As shown, the pivot adjustment assembly 600 includes an interchangeable collet 527 around the threaded bore 526 which threads with the screw 608 of the adjustment device 604 of the roll adjustment assembly 600. Also, as shown, the pivot balls 826 and corresponding grooves 516 form a kinematic arrangement. Also, the steel ball 509 at the end of the pivot adjustment screw 508 situated between the pins 518 also forms a kinematic arrangement. There are other ways to form kinematic arrangements to facilitate the pivoting of the pivoting member 502. As previously discussed, the holes 618 at the sides of the cylindrical guide 612 respectively receive the springs 620 and steel balls 622 to provide a radial biasing load.

Figure 7:
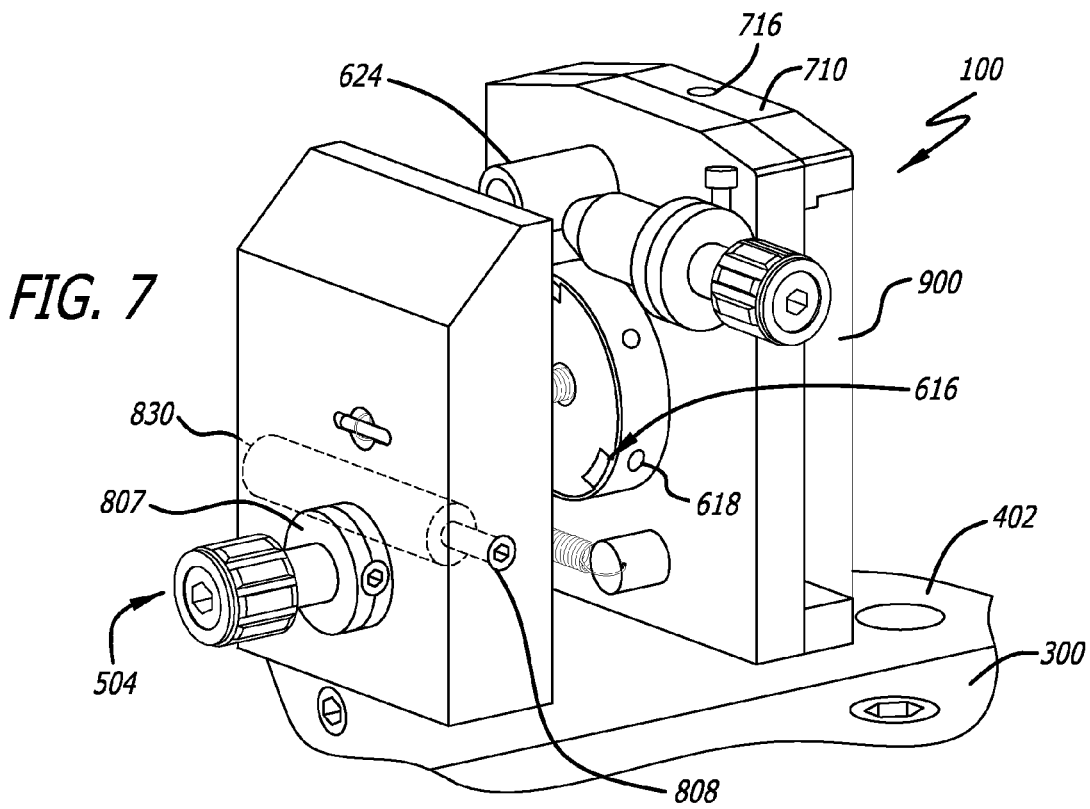
FIG. 7 illustrates a rear partial transparent view of a portion of an exemplary mount for an optical component in accordance with an embodiment of the invention.

FIG. 7 illustrates a rear partial transparent view of a portion of the exemplary mount 100 for an optical component in accordance with an embodiment of the invention. As shown, the bridge assembly 800 includes an interchangeable collet 807 around the threaded bore 806 which threads with the screw 508 of the adjustment device 504 of the pivot adjustment assembly 500. As previously discussed, the cylindrical guide 612 includes a plurality of pads 616 which rides on a bed of lubrication in the countersunk hole of the pivoting member 502. This facilitates the interface of the cylindrical guide 612 to the countersunk hole.

Figure 8:
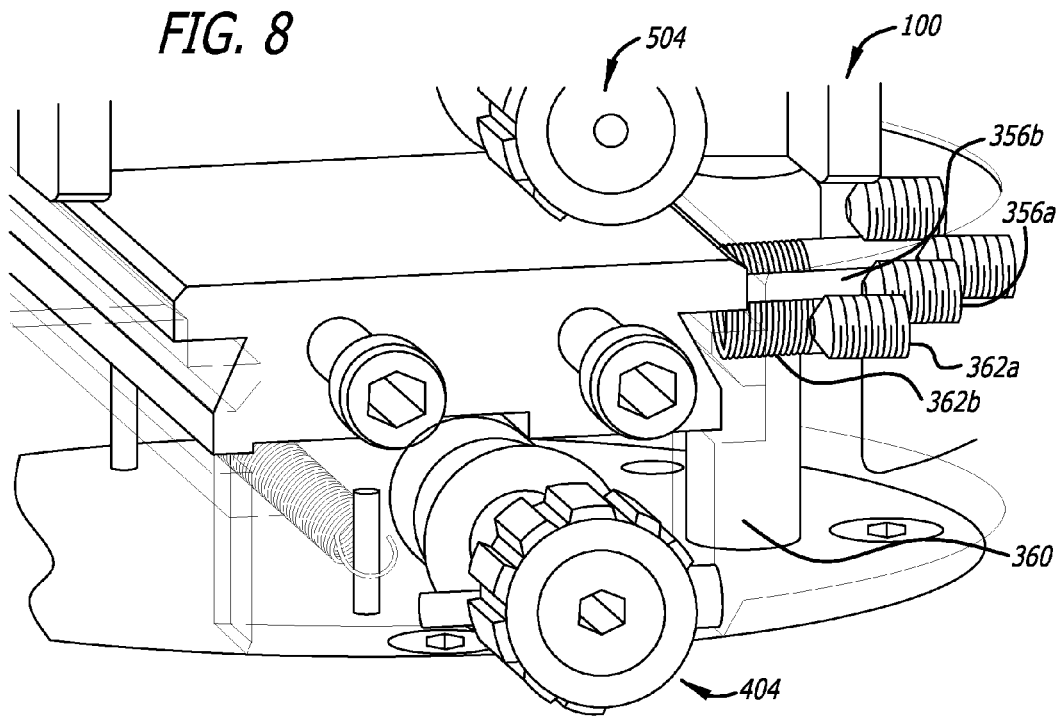
FIG. 8 illustrates a rear view of a portion of an exemplary mount for an optical component in accordance with an embodiment of the invention.

FIG. 8 illustrates a rear view of a portion of the exemplary mount 100 for an optical component in accordance with an embodiment of the invention. As shown, the sets of springs 362b and screws 362a provide lateral biasing force on the elongated resilient guide rail 360. Additionally, the dowel 356b and corresponding locking screw 356a provide a lock to prevent movement of the slider 402 by applying lateral pressure on the elongated resilient guide rail 360, which, in turn, applies pressure to the slider 402 for frictionally locking the slider 402.

Figure 9:
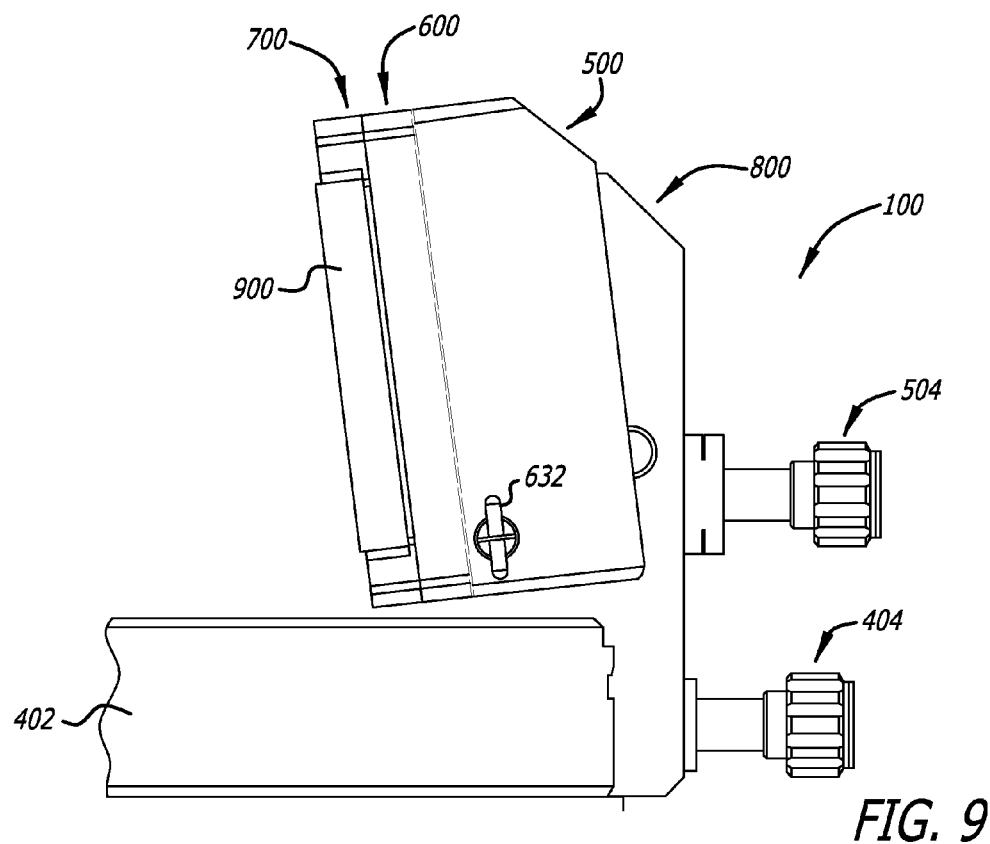
FIG. 9 illustrates a side view of a portion of an exemplary mount for an optical component in accordance with an embodiment of the invention.

FIG. 9 illustrates a side view of a portion of the exemplary mount 100 for an optical component in accordance with an embodiment of the invention. In this diagram, the pivoting member 502 is shown with about a seven (7) degree downward pitch.

Figure 10:
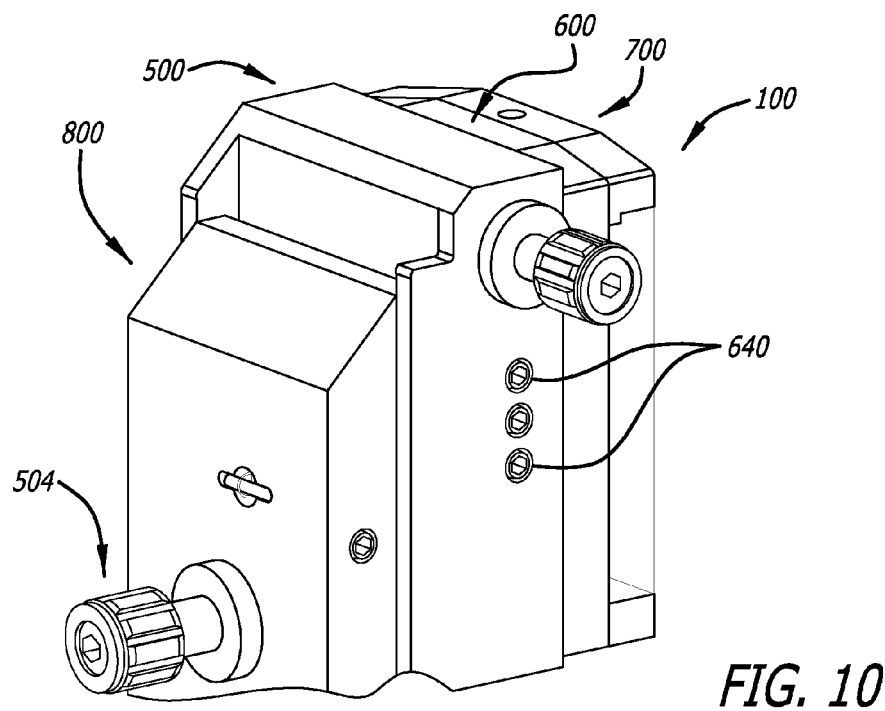
FIG. 10 illustrates a rear perspective view of a portion of an exemplary mount for an optical component in accordance with an embodiment of the invention.

FIG. 10 illustrates a rear perspective view of a portion of the exemplary mount 100 for an optical component in accordance with an embodiment of the invention. The roll adjustment assembly 600 may further comprise a lock 640 for selectively preventing the movement of the rolling member 602 when set to a desired orientation. In this example, the roll adjustment assembly 600 may include a pair of screws situated in thru-holes at the side of the pivoting member 502. The ends of the screws apply pressure to the respective sets of springs 626 and steel balls 622 situated within respective holes 618 at the sides of the cylindrical guide 612. Additionally, the lock 640 may further include a locking screw situated within a threaded thru-hole at the side of the pivoting member 502. The end of the locking screw is adapted to make frictional contact to the side of the cylindrical guide 612 to lock the rolling member 602 in the selected orientation.

Figure 11:
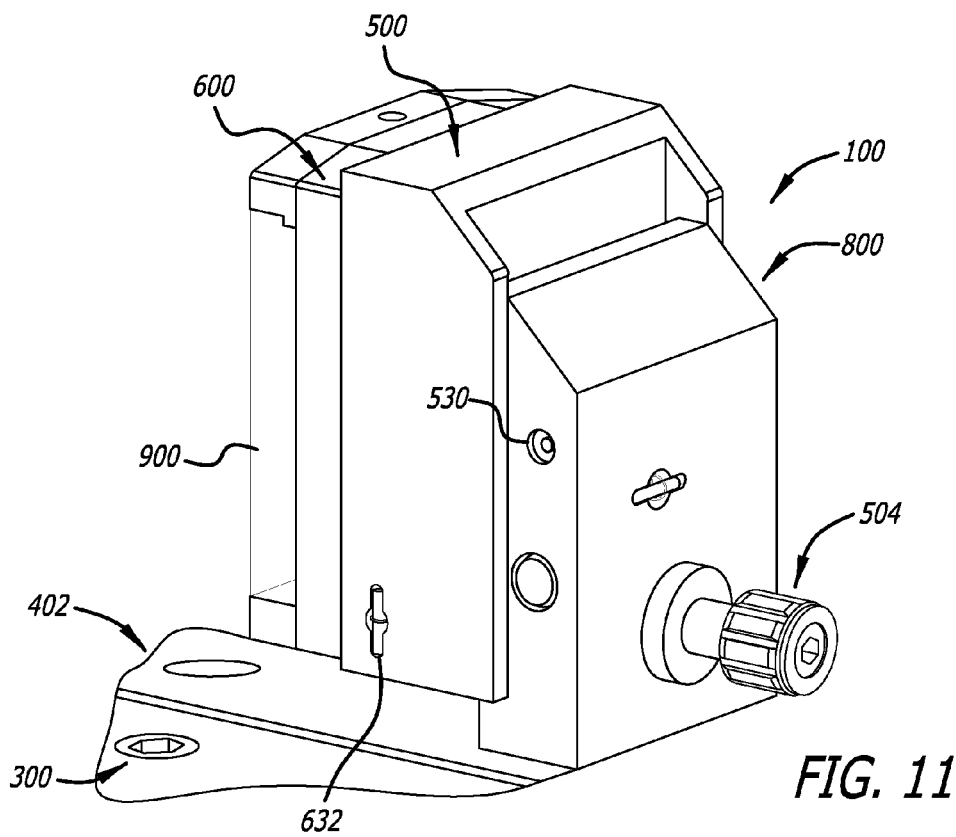
FIG. 11 illustrates a rear perspective view of a portion of an exemplary mount for an optical component in accordance with an embodiment of the invention.
Figure 12:
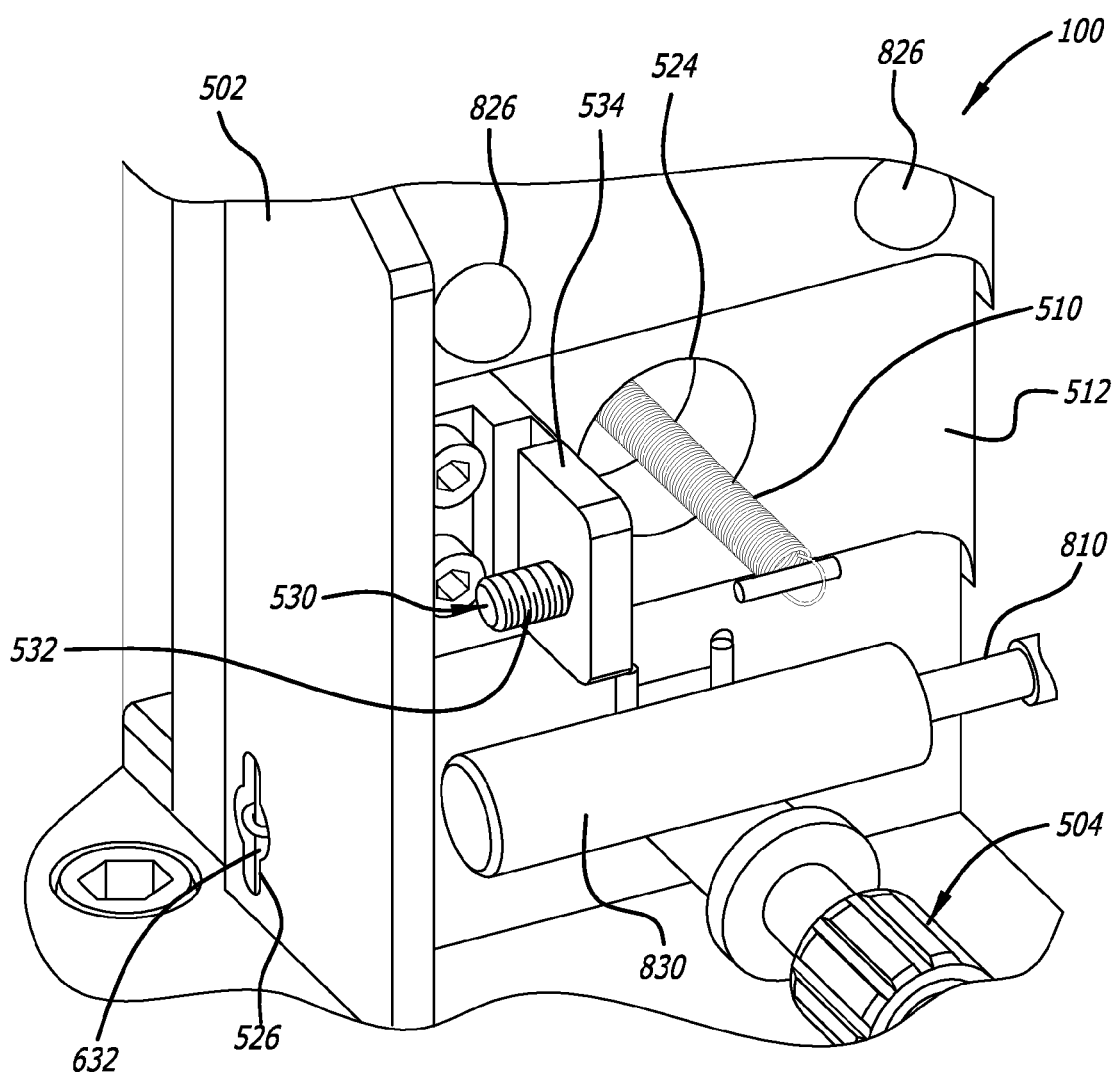
FIG. 12 illustrates an internal view of a portion of an exemplary mount for an optical component in accordance with an embodiment of the invention.

FIG. 11 illustrates a rear perspective view of a portion of the exemplary mount 100 for an optical component in accordance with an embodiment of the invention. Similar to the locking feature 640 of the roll adjustment assembly 600 previously discussed, the pivot adjustment assembly 500 may also include a lock 530 to selectively prevent the movement of the pivoting member 502 when set to a desired orientation. With reference to FIG. 12, the lock 530 comprises a locking set screw 532 situated in a threaded thru-hole at the side of the bridge assembly 800. The end of the screw 532 makes frictional contact to a flange 534 attached to the rear side of the pivoting member 502. The frictional contact prevents pivoting of the pivoting member 502; thereby locking the member in the selected orientation.

Figure 13A:
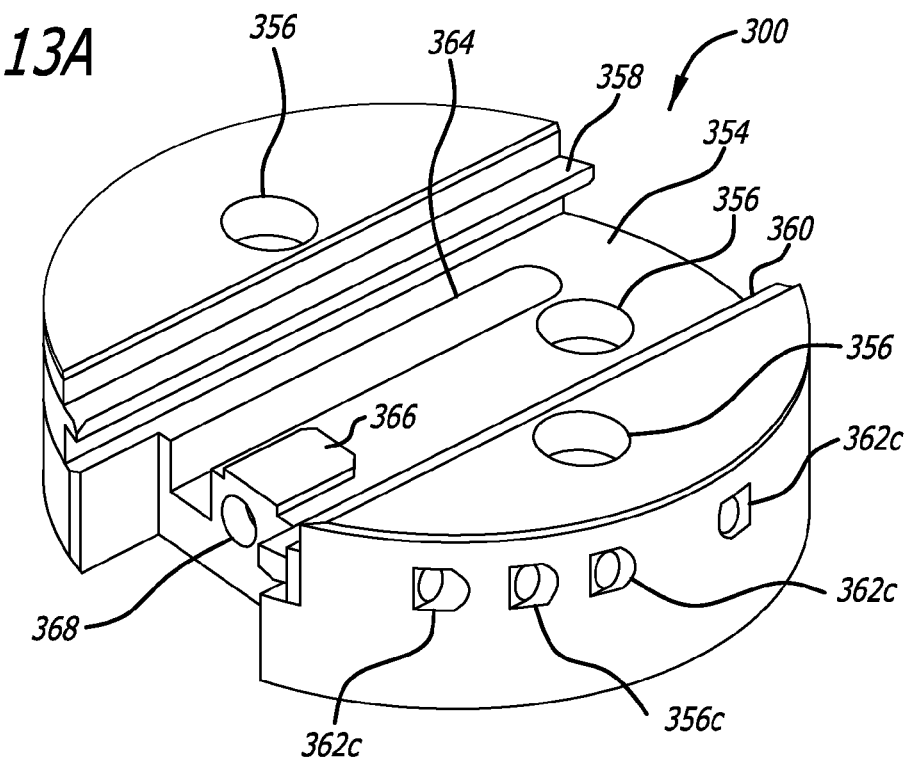
FIGS. 13A-B illustrate perspective and side views of the exemplary base in accordance with an embodiment of the invention.
Figure 13B:
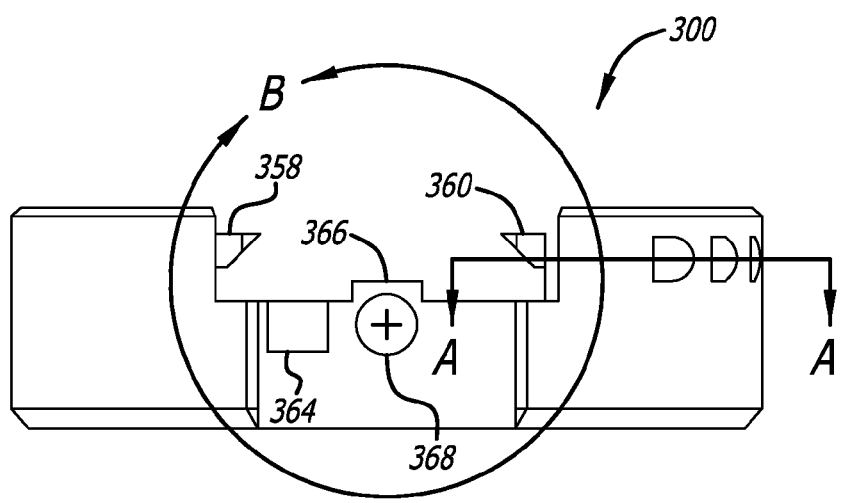

FIGS. 13A-B illustrate perspective and side views of the exemplary base 300 in accordance with an embodiment of the invention. As previously discussed in detail, the base 300 comprises one or more thru-holes 356 to respectively receive threaded screws 352 for securing the base 300 to the upper rotatable portion 250 of the stage 200. The base 300 also comprises the channel 354 through which the slider 402 of the z-axis adjustment assembly 400 moves longitudinally in the z-direction. The base 300 further includes the elongated rigid guide rail 358 situated longitudinally along one side of the channel 354. Additionally, the base 300 includes the elongated resilient guide rail 360 situated longitudinally along the other side of the channel 354.

The base 300 also includes the slot 364 which houses the spring 412 that biases the pad 370 of the base 300 against the end of the screw 408 of the z-axis adjustment device 404. The base 300 includes the stop 366 to stop the movement of the slider 402 in the negative z-direction at a particular position. The base 300 includes the side thru-holes holes 362c to receive respective sets of springs 362b and screws 362a. As previously discussed, the ends of the springs 362b contact the elongated resilient guide rail 360 to absorb lateral forces upon the slider 402. The base 300 further includes the other side thru-hole 356c that receives the dowel 356b and locking screw 356a. During locking, the end of the dowel 356b makes contact with the elongated resilient guide rail 360, which, in turn, makes frictional contact with the slider 402 to prevent the movement of the slider 402; thereby locking it into a selected position.

FIGS. 14A-B illustrate bottom and top perspective views of the exemplary slider 402 in accordance with an embodiment of the invention. As previously discussed in detail, the slider 402 comprises elongated grooves 410 that ride on the elongated rigid and resilient guide rails 358 and 360 of the base 300 as it slides in the z-direction. The slider 402 includes the thru-hole 418 to provide access to one of the screws 352 that mount the base 300 to the upper rotatable portion 250 of the stage 200. The slider 402 further includes the pair of threaded holes 412 that thread with the screws 802 of the bridge assembly 800 to secure the bridge assembly 800 to the slider 402. The slider 402 includes a groove 420 on its bottom that mates with the stop 366 of the base 300. The interior edge of the groove 420 makes contact with the interior edge of the stop 366 to prevent further movement of the slider 402 in the negative z-direction. The slider 402 may include a plurality of ridges 422 at the four corners on the bottom of the slider 402. The ridges 422 reduce the contact area of the slider 402 to the bottom of the channel 354 to reduce friction.

FIGS. 15A-B illustrate rear and front perspective views of the exemplary bridge assembly 800 in accordance with an embodiment of the invention. As previously discussed in detail, the bridge assembly 800 comprises catches 816 and 818 for the securing pins 416 and 512 that respective secure ends of the springs 412 and 510 to the bridge assembly 800. The bridge assembly 800 further comprises the thru-holes 820 and 824 that receive the threaded bores 804 and 806 that threads with the corresponding screws 408 and 508 of the z-axis and pivot adjustment devices 404 and 504, respectively. The bridge assembly 800 also includes the countersunk thru-holes 822 that respectively receive the screws 802 that secure the bridge assembly 800 to the slider 402. The bridge assembly 800 also includes the threaded thru-hole 812 that receive the screws 808 that secures the threaded bore 804 to the bridge assembly 800. The bridge assembly 800 further includes a pair of grooves 825 that receive the steel balls 826 that form the kinematic arrangement with the corresponding holes 516 of the pivoting member 502. The bridge assembly 800 also includes a hole 831 for receiving the rolling pin 830, and the other thru-hole 814 for receiving the screw 810 that threads with the threaded hole 832 of the rolling pin 830 to secure the threaded bore 806 to the bridge assembly 800.

FIGS. 16A-C illustrate a pair of front perspective views and a rear perspective view of the exemplary pivoting member 502 in accordance with an embodiment of the invention. As previously discussed in detail, the pivoting member 502 comprises a thru-hole 524 through which the spring 510 extends from the bridge assembly 800 to the rolling member 602. The pivoting member 502 further comprises the hole 528 for receiving the threaded bore 526 which, in turn, threads with the screw 608 of the roll adjustment device 604. The pivoting member 502 comprises a threaded thru-hole 529 that receives the screw 530 for securing the threaded bore 526 to the pivoting member 502. The pivoting member 502 further comprises a catch 540 for the securing pin 632 that secures an end of the spring 630 to the pivoting member 502. The pivoting member 502 also includes an elongated groove 542 that houses the spring 630 and the other catch 626 that protrudes from the rear side of the rolling member 602. The pivoting member 502 also includes the countersunk hole 544 that receives the cylindrical guide 612 that protrudes from the rear side of the rolling member 602. Additionally, the pivoting member 502 includes an opening 546 that receives the post 624 that protrudes from the rear side of the rolling member 602. As previously discussed, the end of the screw 608 of the roll adjustment device 604 abuts a flat portion of the post 624 within the joining holes 528 and 546.

Figures 17A, 17B:
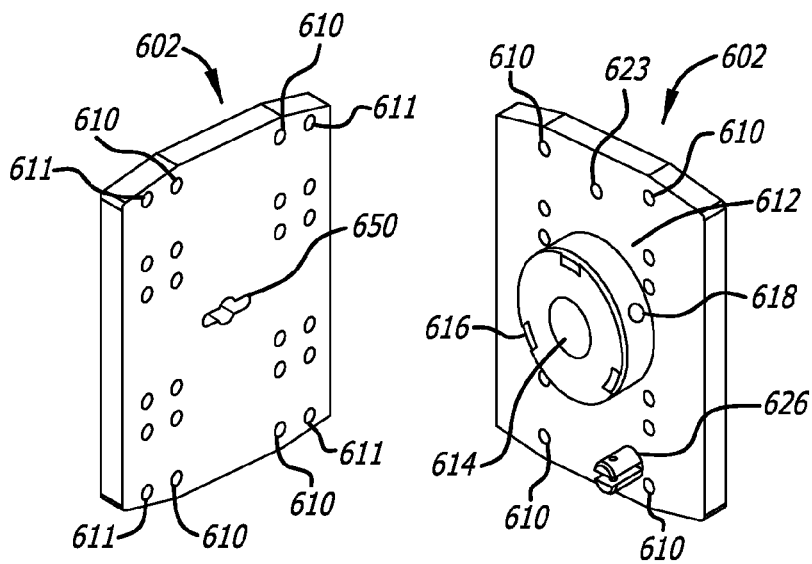
FIGS. 17A-B illustrate front and rear perspective views of the exemplary rolling member in accordance with an embodiment of the invention.

FIGS. 17A-B illustrate front and rear perspective views of the exemplary rolling member 602 in accordance with an embodiment of the invention. As previously discussed, the rolling member 602 comprises sets of threaded thru-holes 610 and fitted holes 611 positioned vertically along the rolling member 602 at predetermined locations to accommodate optical components having different heights. The threaded thru-holes 610 thread with screws 712 to secure the upper and lower members 710 and 750 of the support assembly 700 to the rolling member 602. The other holes 711 receive pins 718 that assist with horizontally aligning the upper and lower member 710 and 750 of the support assembly 700. The rolling member 602 also includes the cylindrical guide 612 that protrudes from the rear side of the rolling member 602 into the countersunk hole 544 of the pivoting member 502.

The cylindrical guide 612 includes the centralized hole 614 that leads to a catch 650 that holds the securing pin 514 that secures an end of the spring 510 to the rolling member 602. The side of the cylindrical guide 612 includes the holes 618 that respectively receive springs 620 and steel balls 622 that provide resilient radial support of the cylindrical guide 612 within the countersunk hole 544 of the pivoting member 502. The cylindrical guide 612 also includes the pads 616 that sits on a bed of lubricant at the bottom surface of the countersunk hole 544. The rolling member 602 also includes the catch 626 for the securing pin 628 that secures an end of the spring 630 to the rolling member 602. The rolling member 602 further includes a threaded hole 623 that threads with a screw 625 that secures the post 624 to the rolling member 602.

Figure 18A:
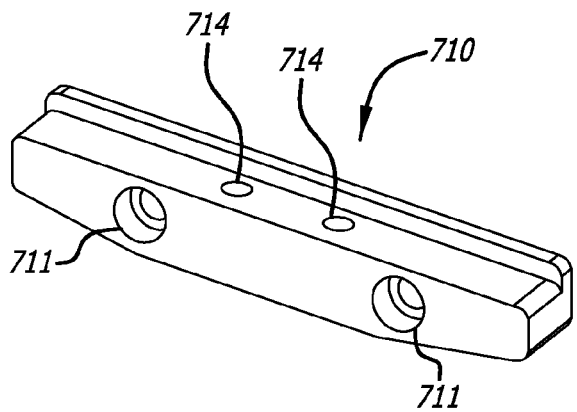
FIGS. 18A-B illustrate perspective views of the exemplary upper and lower support members of the exemplary support assembly in accordance with an embodiment of the invention.
Figure 18B:
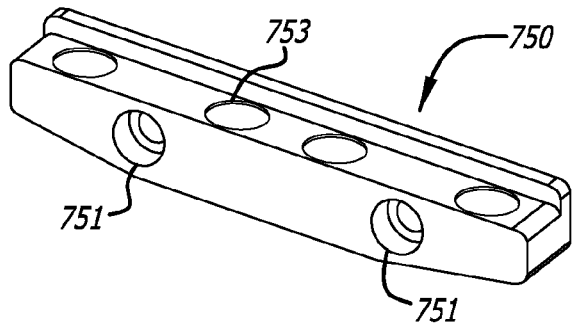

FIGS. 18A-B illustrate perspective views of the exemplary upper and lower members of the exemplary support assembly 700 in accordance with an embodiment of the invention. As previously discussed in detail, the support assembly 700 for the optical component includes the upper support member 710 and the lower support member 750. The upper support member 710 includes a pair of countersunk holes 711 to respectively receive the screws 712 that secure the upper support member 710 to the rolling member 602. The upper support member 710 further comprises one or more holes 714 for receiving one or more screws 716 that secure the optical component onto the support assembly 700. The upper support member 710 includes a pair of holes (not shown in this Figure) to respectively receive the alignment pins 718 that facilitate the horizontal alignment of the upper support member 710 to the rolling member 602.

The lower support member 750 includes a pair of countersunk holes 751 to respectively receive the screws 752 that secure the lower support member 750 to the rolling member 602. The lower support member 750 further comprises a plurality of grooves 753 to respectively receive the pads 754 that cushion the bottom of the optical component. The lower support member 750 includes a pair of holes (not shown in this Figure) to respectively receive the alignment pins that facilitate the horizontal alignment of the lower support member 750 to the rolling member 602.

Figure 19:
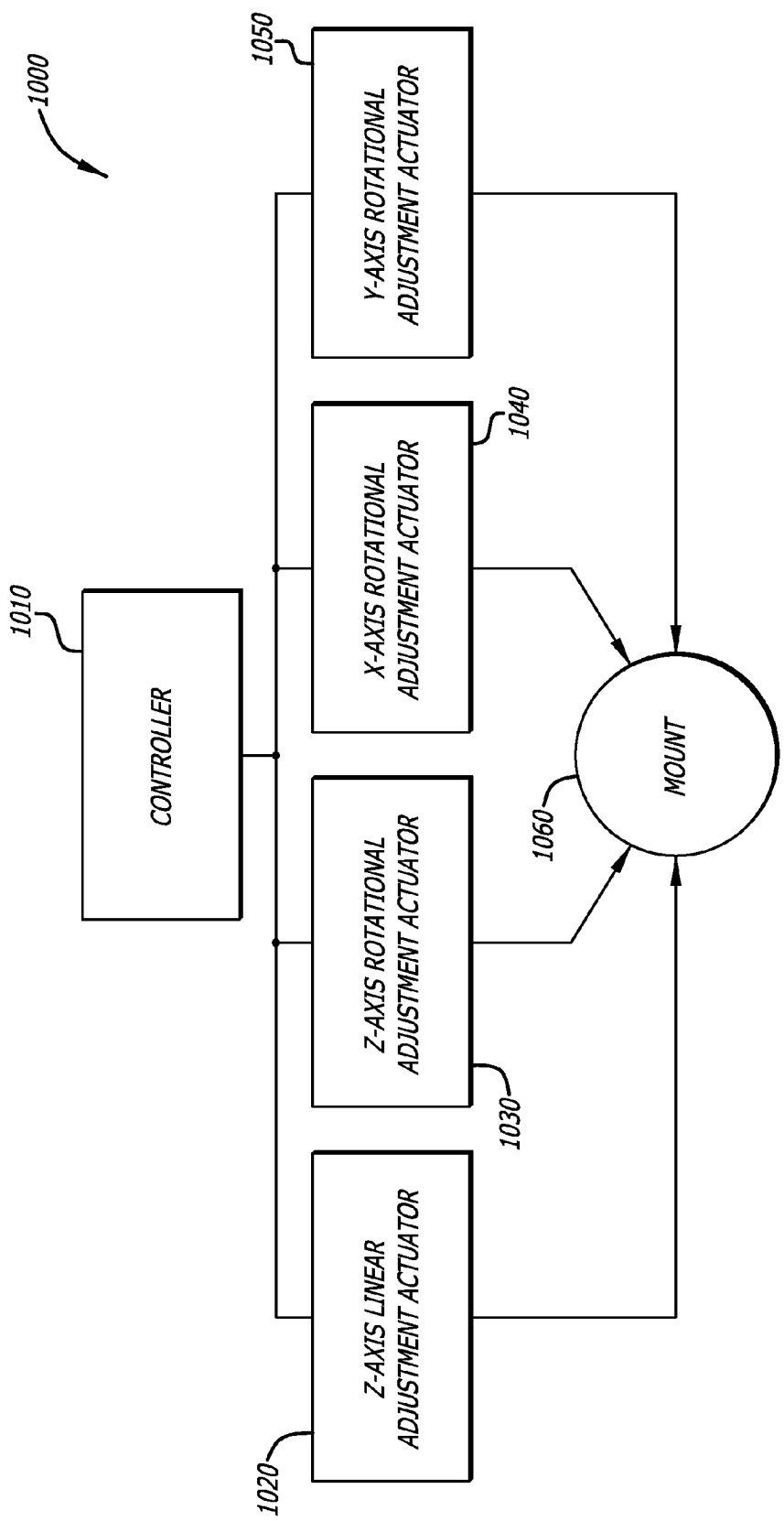
FIG. 19 illustrates a block diagram of an exemplary optical control system in accordance with an embodiment of the invention.

FIG. 19 illustrates a block diagram of an exemplary optical control system 1000 in accordance with an embodiment of the invention. The optical system 1000 that provides for electronic control of a mount to selectively position and orientate an optical component supported thereon. In this exemplary embodiment, the optical control system 1000 comprises a controller 1010, a z-axis linear adjustment actuator 1020, a z-axis rotational adjustment actuator 1030, an x-axis rotational adjustment actuator 1040, and a y-axis rotational adjustment actuator 1050. The actuators are coupled and controlled by the controller 1010. The actuators, in turn, are coupled to a mount 1060, such as the mount 100 previously described, in order to position and orientate an optical component mounted thereon. Thus, in this embodiment, the position and orientation of the optical component can be controlled electronically by a controller 1010. It shall be understood that the optical control system 1000 may further include an x-axis and/or y-axis linear adjustment actuators if the mount 1060 is equipped with x- and y-axes linear adjustment assemblies.

In summary, the mount 100 provides for independent adjustment of the optical component along one or more linear axes and one or more rotational axes. Accordingly, the mount 100 provides versatility in properly positioning and orienting an optical component in an optical system. This can save substantial amount of labor time and costs. The mount 100 may be made of various types of materials, such as brass, steel, aluminum, glass reinforced polymer, and others.

While an improved mount and optical control system are disclosed by reference to the various embodiments and examples detailed above, it should be understood that these examples are intended in an illustrative rather than limiting sense, as it is contemplated that modifications will readily occur to those skilled in the art which are intended to fall within the scope of the present invention.

What is claimed is:

1. A mount for an optical component, comprising:
   a support element for supporting said optical component;
   a first adjustment element for moving said support element only along a first axis;
   a second adjustment element for rotating said support element only about said first axis;
   a third adjustment element for rotating said support element only about a second axis that is substantially orthogonal to said first axis; and
   a fourth adjustment element for rotating said support element only along a third axis substantially orthogonal to said first and second axes.

2. The mount of claim 1, wherein said support element is attached to said second adjustment element.

3. The mount of claim 1, wherein said second adjustment element is pivotally coupled to said third adjustment element.

4. The mount of claim 1, wherein said first adjustment element is coupled to said third adjustment element.

5. The mount of claim 4, wherein said first adjustment element is coupled to said third adjustment element by way of a bridge element.

6. The mount of claim 1, wherein said first adjustment element comprises an adjustment device for manually adjusting said movement of said support element only along said first axis.

7. The mount of claim 1, wherein said first adjustment element is adapted to receive an actuator arm for adjusting said movement of said support element only along said first axis.

8. The mount of claim 1, wherein said second adjustment element comprises an adjustment device for manually adjusting said rotation of said support element only about said first axis.

9. The mount of claim 1, wherein said second adjustment element is adapted to receive an actuator arm for adjusting said rotation of said support element only about said first axis.

10. The mount of claim 1, wherein said third adjustment element comprises an adjustment device for manually adjusting said rotation of said support element only about said second axis.

11. The mount of claim 1, wherein said third adjustment element is adapted to receive an actuator arm for adjusting said rotation of said support element only along said second axis.

12. The mount of claim 1, wherein said fourth adjustment element comprises an adjustment device for manually adjusting said rotation of said support element only along said third axis.

13. The mount of claim 1, wherein said fourth adjustment element is adapted to receive an actuator arm for adjusting said rotation of said support element only along said third axis.

14. The mount of claim 1, wherein said fourth adjustment element supports said support element, and said first, second, and third adjustment elements.

15. The mount of claim 1, wherein said optical component comprises a substantially optically reflective device.

16. The mount of claim 1, wherein said optical component comprises a substantially optically transmissive device.

17. The mount of claim 1, wherein said optical component comprises a diffraction grating, mirror, or beam splitter.

18. A mount for an optical component, comprising:
a support assembly for supporting said optical component;
a first adjustment assembly for moving said support assembly along a first axis;
a second adjustment assembly for rotating said support assembly about said first axis;
a third adjustment assembly for rotating said support assembly about a second axis that is substantially orthogonal to said first axis; and
a rotatable stage comprising a lower fixed portion and an upper rotatable portion that rotates about a third axis that is substantially orthogonal to said first and second axes, wherein said rotatable stage supports said first, second, and third assemblies.

19. The mount of claim 18, wherein said support assembly comprises:
a first support member adapted to contact a first end of said optical component; and
a second support member adapted to contact a second end of said optical component.

20. The mount of claim 19, wherein said first and second support members are attached to said second adjustment assembly.

21. The mount of claim 19, wherein said first and second support members are adapted to attach to said second adjustment assembly at different predetermined locations to accommodate different sizes for said optical component.

22. The mount of claim 18, wherein said second adjustment assembly is rotationally coupled said third adjustment assembly.

23. The mount of claim 18, further comprising a lock for locking said second adjustment assembly to a selected orientation.

24. The mount of claim 18, wherein said third adjustment assembly is pivotally coupled said first adjustment assembly.

25. The mount of claim 24, wherein said third adjustment assembly is pivotally coupled to said first adjustment assembly via a bridge assembly.

26. The mount of claim 18, further comprising a lock for locking said third adjustment assembly to a selected orientation.

27. The mount of claim 18, further comprising a base including a channel through which said first adjustment assembly moves along said z-axis.

28. The mount of claim 18, further comprising a lock for locking said first adjustment assembly to a selected position.

29. The mount of claim 18, further comprising a lock for locking said rotatable stage to a selected orientation.

30. A mount for an optical component, comprising:
a support assembly for supporting said optical component;
a first adjustment assembly for moving said support assembly along a first axis;
a second adjustment assembly for rotating said support assembly about said first axis;
a third adjustment assembly for rotating said support assembly about a second axis that is substantially orthogonal to said first axis;
wherein said second adjustment assembly is rotationally coupled said third adjustment assembly; and
a spring attached to said second and third adjustment assemblies to angularly bias said second adjustment assembly about said first axis.

31. A mount for an optical component, comprising:
a support assembly for supporting said optical component;
a first adjustment assembly for moving said support assembly along a first axis;
a second adjustment assembly for rotating said support assembly about said first axis;
a third adjustment assembly for rotating said support assembly about a second axis that is substantially orthogonal to said first axis; and
wherein said third adjustment assembly is pivotally coupled to said first adjustment assembly via a bridge assembly; and
a spring attached to said bridge and third adjustment assemblies to angularly bias said third adjustment assembly about said second axis.

32. A mount for an optical component, comprising:
a support assembly for supporting said optical component;
a first adjustment assembly for moving said support assembly along a first axis;
a second adjustment assembly for rotating said support assembly about said first axis;
a third adjustment assembly for rotating said support assembly about a second axis that is substantially orthogonal to said first axis;
a base including a channel through which said first adjustment assembly moves along said z-axis; and
a spring attached to said base and said first adjustment assembly to bias said base against an adjustment device of said first adjustment assembly.

* * * * *

UNITED STATES PATENT AND TRADEMARK OFFICE
CERTIFICATE OF CORRECTION

| | | |
|---|---|---|
| PATENT NO. | : 7,688,528 B2 | Page 1 of 1 |
| APPLICATION NO. | : 11/828841 | |
| DATED | : March 30, 2010 | |
| INVENTOR(S) | : Michael Heuser et al. | |

It is certified that error appears in the above-identified patent and that said Letters Patent is hereby corrected as shown below:

Title Page, Item (75) Inventors should read

Inventors: Michael Heuser, Rancho Santa Margarita, CA (US)

Christopher Guerrero, Irvine, CA (US)

Signed and Sealed this

Eighteenth Day of May, 2010

David J. Kappos
*Director of the United States Patent and Trademark Office*